(12) United States Patent
Luh

(10) Patent No.: US 7,022,043 B2
(45) Date of Patent: Apr. 4, 2006

(54) METHOD FOR CONTROLLING SLIP ON A CLUTCH ASSIGNED TO AN AUTOMATIC TRANSMISSION

(75) Inventor: Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/442,085

(22) Filed: May 21, 2003

(65) Prior Publication Data

US 2003/0220172 A1 Nov. 27, 2003

(30) Foreign Application Priority Data

May 22, 2002 (DE) ............................... 102 22 664

(51) Int. Cl.
*B60K 41/12* (2006.01)
(52) U.S. Cl. .......................................... 477/45; 477/39
(58) Field of Classification Search .................... 70/53, 70/58, 65
See application file for complete search history.

(56) References Cited

U.S. PATENT DOCUMENTS

| | | | |
|---|---|---|---|
| 4,811,225 A | * | 3/1989 | Petzold et al. ................. 477/39 |
| 5,098,345 A | | 3/1992 | Van Vuuren |
| 5,431,602 A | * | 7/1995 | Hendriks et al. .............. 477/48 |
| 5,655,996 A | * | 8/1997 | Ohtsuka ....................... 477/166 |
| 5,853,347 A | * | 12/1998 | Aoki et al. .................... 477/45 |
| 6,418,365 B1 | * | 7/2002 | Loffler et al. .................. 477/43 |
| 6,547,692 B1 | * | 4/2003 | Ries-Mueller et al. ........ 477/45 |

FOREIGN PATENT DOCUMENTS

| | | |
|---|---|---|
| DE | 199 03 554 | 8/2000 |
| DE | 100 28 459 | 12/2000 |

* cited by examiner

*Primary Examiner*—Roger Pang
(74) *Attorney, Agent, or Firm*—Walter Ottesen

(57) ABSTRACT

The invention is directed to a method for controlling the operation of a clutch (19) which coacts with an automatic transmission stage (17). A variator controller (16) is assigned to the automatic transmission stage (17) and a contact-force control (18) is assigned to the clutch (19). Depending upon the detected and classifiable drive situations, first and second torque/contact-force reserves (13, 44) are determined which are supplied to an input quantity $M_E$ (22) of the variator controller (16) and to the contact-force control (18) for the clutch (19). The output signals (20, 21) of the variator controller (16) and the contact-force control (18) influence the operation of the automatic transmission stage (17) and the clutch (19).

17 Claims, 2 Drawing Sheets

US 7,022,043 B2

METHOD FOR CONTROLLING SLIP ON A CLUTCH ASSIGNED TO AN AUTOMATIC TRANSMISSION

FIELD OF THE INVENTION

Automatic transmissions are increasingly utilized at the present time in motor vehicles in addition to manual transmissions having start-drive and separation clutches as well as a rear wheel changing transmission. These automatic transmissions are, for example, automatic transmissions which shift under load. Continuously variable transmissions are included in those automatic transmission which shift under load. These transmissions can be configured mechanically, hydraulically or electrically. Belt transmissions belong to the mechanical transmissions and include a transmission element configured as a continuous steel belt. As a rule, elements for establishing and interrupting the flow of force such as, for example, slip-controlled clutches, are assigned to such automatic transmissions.

BACKGROUND OF THE INVENTION

A continuous variable force transmission is known from U.S. Pat. No. 5,098,345. The continuously variable transmission disclosed in this publication includes a primary belt pulley which is accommodated on a primary shaft and a secondary belt pulley which is accommodated on a secondary shaft. A continuous belt-shaped transmission element is arranged between the primary and secondary belt pulleys and functions for transmitting torque between the two belt pulleys. In the transmission path of the torque, frictive slip preventing means are accommodated in such a manner that, in all operating conditions, it is ensured that the maximum torque, which is to be transmitted via the slip preventing means, in these conditions, is less than the slip torque of the continuous transmission element under these identical operating conditions. The transmission element is configured as a continuously running steel belt. The frictive slip preventing means contain clutch elements of the friction-plate type which are adjustable. The adjustability can take place especially via a fluid. For this purpose, a piston unit is provided which is mounted within a cylinder and which contains the fluid for bringing about the adjustability of the clutch.

According to this solution, only an inadequate consideration of the drive situation of the motor vehicle takes place during the determination of the applied contact of an automatic transmission stage (variator) or a coupling.

SUMMARY OF THE INVENTION

A slipping operation of a clutch can be prevented, in dependence upon occurring drive situations of a motor vehicle, with the procedure provided by the invention. This takes place in that a torque reserve or contact-force reserve can be called up at a contact-force control assigned to the clutch. The clutch can be charged with this reserve in dependence upon occurring specific drive situations of the motor vehicle in order to prevent the occurrence of slippage at the clutch. With the suggested method, a torque reserve or contact-force reserve of a variator controller, which is assigned to the automatic transmission, can be outputted in a targeted manner in dependence upon the detected drive situation for charging the adjustable belt pulley components of the automatic transmission. The contact-force control can include a slip controller.

Drive situations of the vehicle are classified in the electronic control of an automatic transmission such as a continuously variable transmission. In order to achieve this, different sensor signals or control signals are applied. These are advantageously control apparatus for: controlling the internal combustion engine, the transmission and the driving dynamic such as ABS, ASR and ESP. The signals, which make possible the determination and the classification of the particular drive situation of the vehicle, are, for example, the wheel rpm, rate of rotation of the vehicle, the transmission rpm with respect to the input and output transmission rpm(s), the rpm of the internal combustion engine and signals as to the actual vehicle speed. Furthermore, the actual drive situation can be determined from the following: the position of the accelerator pedal; the outputted torque of the internal combustion engine; the transmission ratio of the transmission; the signals for driving the clutches; and, information of the selection lever of the automatic transmission with respect to the set driving stage.

In addition to other drive situations, the following drive situations can be classified in the context of examples. When the selection lever of an automatic transmission is in the position P, the drive situation standstill or close to standstill is detected and correspondingly classified. Furthermore, based on the selection lever position of the automatic transmission in the positions D or R, a standstill of the vehicle is detected, for example, at a traffic light stop or when moving back and forth. With the selection lever positions D or R, the drive situation of slow travel with low load (that is, a forward movement or backward movement at constant speed) can likewise be detected. Furthermore, with the set selection lever stages D, R of the automatic transmission, an acceleration operation at high load can be detected. If the vehicle exceeds a specific speed threshold, the drive situation "rapid travel" can be detected with the selection lever stage D set on the automatic transmission and can be correspondingly classified. Furthermore, it is possible to detect the drive situation "travel with high engine and/or transmission rpm" with the driving stage D set and with the driving stage R of the automatic transmission (which occurs only infrequently).

In addition to the above exemplary listed classical drive situations, drive situation changes can be included and the slow travel with set selection lever stage N (neutral) can be detected and classified. The travel on a poor roadway can likewise be detected, for example, from signals of the traction control. A driving state with activated ABS, ASR or ESP intervention can also be detected as well as the intervention of an automatic blocking system. Also, the starting of the internal combustion engine in the start/stop operating mode, for example, in city traffic can be detected. Furthermore, the drive situation of a vehicle can be detected which is operated in an emergency or partial emergency situation. A break-out of the vehicle can be detected from signals of the traction control.

Depending upon the drive situations of a motor vehicle listed as exemplary above, the mode of operation can be influenced by varying a drive situation dependent torque/contact-force reserve for a contact-force control of the clutch. Slippage is to be avoided as best as possible at full load and during acceleration because, in these situations, the maximum transmittable torque is requested. In these drive situations, the clutch (be it a dry clutch or a wet clutch) is charged by a contact-force reserve so that, for example, between the lamellae or the friction surfaces of the clutch, the slip is zero because of the high contact forces. With the solution of the invention, the torque reserve or contact-force reserve of the variator controller for the automatic transmission can be influenced also in dependence upon the detected and correspondingly classified drive situation or in dependence upon the mode of operation of the contact-force control of the clutch with this mode of operation being derived from the detected and correspondingly classified drive situation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
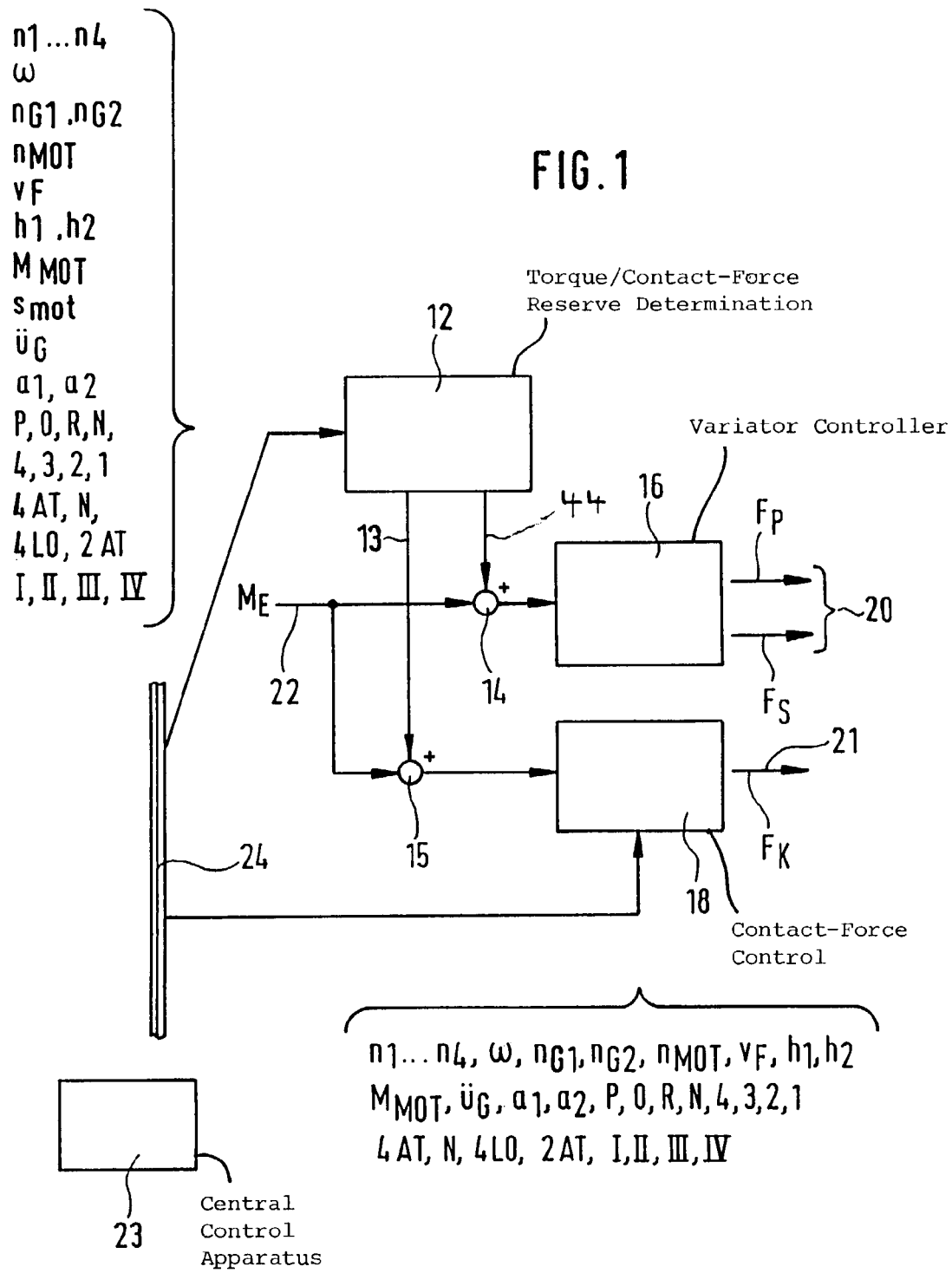
FIG. 1 is a block circuit diagram of the control of a variator controller for an automatic transmission and a contact-force control for the clutch; and, FIG. 2 is a schematic configuration of the automatic transmission stage and the clutch.

The block circuit diagram of FIG. 1 shows the control of the variator controller for the automatic transmission and the control of the contact-force control for the clutch.

Drive situations of a vehicle can be detected and correspondingly classified in an electronic control of an automatic transmission of a motor vehicle. For this purpose, different sensor signals and also control signals of electronic control apparatus are used (such as of the control of the engine and of the automatic transmission) and systems (such as ABS, ASR and ESP), which detect the driving dynamic of the vehicle and respond thereto.

The rpms ($n_1$, $n_2$, $n_3$, $n_4$) of the wheels of the motor vehicle can be detected via wheel rpm sensors assigned to the wheels of the motor vehicle. The wheel rpm can be different in specific situations and can, for example, lead to an intervention of ABS. The wheel rpms $n_1$ to $n_4$ vary depending upon drive situations and depending upon traction on the road surface and when a vehicle is stuck in an uneven topography. Based on the particularly detected wheel rpm $n_1$ to $n_4$, that wheel of the wheels of the vehicle can be identified which, just then, does not slip. The yaw rates $\omega$ of the vehicle can be detected by yaw rate sensors. The yaw rates are applied, for example, in motor vehicles having navigation systems for locating the motor vehicle and can therefore be used in the determination of the particular drive situation of the motor vehicle. The electronic control of an automatic transmission detects the input rpm $n_{G1}$ of the transmission as well as its output rpm $n_{G2}$. The rpm of the drive of an internal combustion engine is, for example, detected via a crankshaft transducer which operates together with a camshaft transducer and is therefore known in the central control apparatus 23 of a motor vehicle. Furthermore, a detection of the vehicle speed is understood, for example, from the wheel rpms ($n_1$, $n_2$, $n_3$, $n_4$) and a conclusion can be drawn as to the forward motion of the vehicle at a specific speed.

Furthermore, quantities, which characterize the drive situation of a motor vehicle, can be considered and these quantities include the pedal distance of the accelerator pedal $h_1$, or the pedal distance of the brake pedal $h_2$. Further, the engine torque $M_{MOT}$ can, for example, be detected which the internal combustion engine just then outputs in the event such an engine is utilized for driving the vehicle. Also, the operating state of the control of the internal combustion engine can be detected via a signal $S_{MOT}$. Furthermore, the particular transmission ratios $U_G$ can be detected via the electronic control of the automatic transmission as well as, if required, the drive signals of clutches ($a_1$, $a_2$). Furthermore, the mode of operation of the engine can be detected as well as its warm-running phase. The operating modes include, for example, homogeneous operation and lean operation.

Quantities, which characterize the instantaneous drive situation of the motor vehicle and which are available to various vehicle systems via a central control bus 24, can be called up in a central control apparatus 23. In addition to these quantities, the particular set selector lever stages of a selector lever of the automatic transmission can be applied for characterizing the drive situations and for classifying the same. In automatic transmissions of motor vehicles, the stages P, D, R, N can be set and, in individual cases, driving stages 1, 2, 3 and 4 can be set which prevent an upshift into higher gears. The particular selected selector lever stage is known in the electronic control of an automatic transmission and can therefore also be taken into account for characterizing the instantaneous drive situation while considering the drive dynamic systems ABS, ASR or ESP.

In motor vehicles which are designed for off-road use, the selector lever sequence 4AT (4 wheels all time), which is designed especially for off-road travel, N, 4LO (four wheel drive with gear reduction) as well as 2AT (one axis permanently driven) can be applied for characterizing an instantaneous drive situation. These driving states are also known in the electronic control of the transmission because of a corresponding position of the selector lever of the automatic transmission.

In addition, it is also possible to apply different suspension stages of a hydraulic or pneumatically operating suspension system of a motor vehicle to determine instantaneous drive situation. The different suspension stages (I, II, III, IV) which are pre-selectable on motor vehicles having pneumatically or hydraulically charged suspension systems, can likewise be used in the consideration of the instantaneous drive situation of the vehicle. Also, the quantity, which characterizes the particularly selected suspension stage of a pneumatically or hydraulically charged suspension system, can be made available via the central data bus 24 within a motor vehicle by a central control apparatus 23 to other systems which characterize the drive dynamic.

In addition to the above-mentioned quantities, which characterize the instantaneous drive situation of a motor vehicle, as ancillary to the yaw rates $\omega$ of a vehicle, the particular vehicle inclination can be determined, for example, by considering the tank fill level sensors. For characterizing the instantaneous drive situation of a motor vehicle, it can be advantageous to determine whether just then an uphill travel is to be overcome or a downhill travel. In addition to these input quantities for determining the drive situation and the drive dynamic, which characterize the inclination of the motor vehicle (for example, about the transverse axis), the pulses of the vehicle brake system can be applied for determining the instantaneous drive situation which are already applied for determining an ABS intervention.

The quantities, which characterize the drive situation in the block circuit diagram of FIG. 1, can be supplied as input quantities (for example, made available via a central data bus 24) to a torque/contact-force reserve determination 12. The plurality of listed input signals, which characterize the instantaneous drive situation, has as a condition precedent a corresponding power capability of the central data bus 24 and the central control apparatus 23 and the torque/contact-force reserve determination 12 or a contact-force control 18 for a clutch 19. Depending upon the input quantities which are applied at the input end to the torque/contact-force determination 12, the latter determines a drive situation dependent contact-force reserve 13 for the clutch as well as a contact-force reserve 44 for a variator controller of an automatic transmission stage 17. The output signal, which corresponds to this first torque/contact-force reserve 13, is superposed on an input signal 22 of a contact-force control 18 for the clutch 19. The output signal, which corresponds to the second torque/contact-force reserve 44 for the variator 17, is superposed on an input signal 22 of a variator controller 16 for an automatic transmission stage 17. The input quantity 22 of the variator controller 16 of the automatic transmission stage 17 and the contact-force control 18 of the clutch 19 is a torque signal which defines the torque, which is to be transmitted by the variator and which is essentially developed by the internal combustion engine. For an open bridging clutch on a torque converter, a torque amplification can be obtained via this converter which can be considered, if required, in the formation of the input quantity 22.

The input quantity 22, that is, a torque signal, defines the torque which is to be transmitted by the automatic transmission stage 17 (variator) and is supplied to the contact-force control 18 for the clutch 19. The determined torque/contact-force reserves 13 and 44 are superposed at summation points 14 and 15, respectively, on the input quantity 22 in the torque/contact-force reserve determination 12 of the variator controller 16 and the contact-force control 18 for the clutch 19. The input quantity of the variator controller 16 as well as the input quantity of the contact-force control 18 for the clutch 19 is therefore supplemented by the torque/contact-force reserves 13 or 44 which are determined in the torque/contact-force reserve determination 12. The variator controller 16 determines output signals for the automatic transmission stage 17 of an automatic transmission 45 or the contact-force control 18 for the clutch 19 in dependence upon the input quantity 22, which is supplemented by the torque/contact-force reserves 13 or 44. This input quantity 22 characterizes the torque which is to be transmitted by the automatic transmission stage 17 (variator) and is developed essentially by the internal combustion engine. The variator controller 16 determines output signals 20, that is, the output signals $F_p$ and $F_s$. The contact-force control 18 for the clutch 19 generates the signal 21 as an output quantity and this output signal is characterized as $F_K$. The slip between the friction partners is adjusted by the clutch 19. A continuous tracking of the input quantity of the variator controller 16 for the automatic transmission stage 17 and the contact-force control 18 for the clutch 19 is ensured because of the superposition of the torque/contact-force reserves 13 or 44 on the input signal 22. These torque/contact-force reserves 13 or 44 are determined in dependence upon the drive situation. The torque/contact-force reserves 13 or 44 are simultaneously impressed on the variator controller 16 and the contact-force control 18 for the clutch 19 at summation points 14 and 15, respectively, so that a direct consideration of the torque/contact-force reserves 13 or 44 is ensured in dependence upon the drive situation in the output signals 20 and 21, generated by the variator controller 16 and the contact-force control 18 for the clutch 19, respectively.

The mentioned sensor or control signals ($n_1$, $n_2$, $n_3$, $n_4$, $\omega$, $n_{G1}$, $n_{G2}$, $n_{MOT}$, $V_F$, $h_1$, $h_2$, $M_{MOT}$, $U_G$, $a_1$, $a_2$), which characterize the drive situation, as well as the set selection lever stages of the automatic transmission 17 (P, D, R, N, 4, 3, 2, 1) or for vehicles having off-road settings (4AT, N, 4LO, 2AT) or the quantities (I, II, III, IV), which characterize the suspension stages, can be inputted directly to the torque/contact-force reserve determination 12 as well as the contact-force control 18 for the clutch 19 as shown by the symbols within the brackets of FIG. 1.

Figure 2:
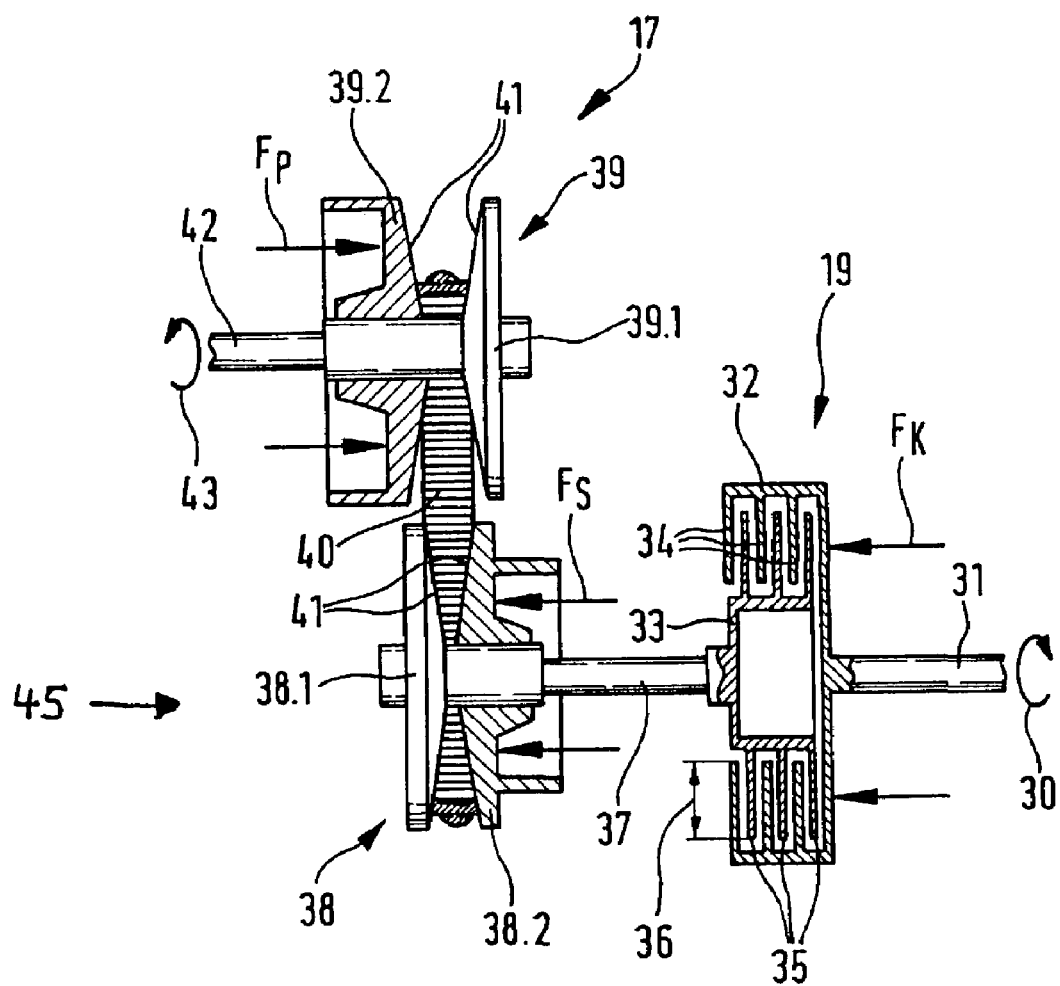

FIG. 2 shows schematically the configuration of an automatic transmission stage which coacts with a clutch.

From FIG. 1, it can be seen that the clutch 19 is arranged at the output end of the automatic transmission stage 17 (variator). A drive shaft 31 extends from the clutch 19 to the drive train of the wheels of the motor vehicle. In FIG. 2, the clutch 19 includes a first clutch part 32 as well as a second clutch part 33. The first clutch part 32 is accommodated on the drive shaft 31 of the drive train. The second clutch part 33 is accommodated on an output shaft 37 of the automatic transmission stage 17 (variator) and is driven by a disc element 38.1 of a first pulley 38 of the automatic transmission stage 17 (variator). The disc element 38.1 is fixed in the axial direction.

The first clutch part 32 includes clutch discs 34 of which several can be arranged one behind the other in axial direction. On the second clutch part 33, clutch discs 35 are likewise configured and correspond to the recesses of the individual clutch discs 34 of the first clutch part 32. Depending upon the number of the clutch discs 34 and 35, torques of different magnitude can be transmitted from an automatic transmission stage 17 (variator) to the clutch 19 and from the clutch 19 into the drive train to the wheels of the motor vehicle. The clutch discs 34 and 35 are configured in the axial direction of the clutch 19 on the clutch parts 32 and 33, respectively. The overlap, with which the individual clutch discs 34 and 35 of the clutch 19 overlap in the radial direction, is indicated by reference numeral 36 and the double arrow corresponding thereto. The contact force $F_K$, which charges an end face of the first clutch part 32 in FIG. 2, is so influenced in dependence upon the drive situation that, for a corresponding magnitude of the contact force $F_K$, (which acts on the clutch 19), a slip between the individual clutch discs 34 and 35 of the first and second clutch parts 32 and 33, respectively, is prevented. The contact force $F_K$ corresponds to the output signal 21 of the contact-force control 18 assigned to the clutch 19. The above can be desired, for example, in a drive situation wherein the motor vehicle is accelerated or in which a trailer load must be moved up a long hill in a motor vehicle having a trailer clutch.

The output shaft 37 of the automatic transmission stage 17 (variator) accommodates the already-mentioned first disc element 38.1 of a first pulley 38 of the automatic transmission stage 17. The disc element 38.1 is fixed in position in the axial direction. The automatic transmission stage 17 (variator) shown in FIG. 2 is a continuous automatic transmission stage 17 which is shiftable under load and whose transmitting element is formed by a steel belt 40. The first pulley 38 of the automatic transmission stage 17 includes the already-mentioned disc element 38.1 as well as a second disc element 38.2 which is axially displaceable and movable in the axial direction relative to the disc element 38.1. The disc element 38.1 is fixedly mounted and is fixed in the axial direction. The sides of the disc elements 38.1 and 38.2 face toward the transmitting element 40 configured in the form of a belt and these sides are configured with flanks 41 so that a distance, which expands in the radial direction, is adjusted between the inner sides of the disc elements 38.1 and 38.2, respectively, of the first pulley 38 of the automatic transmission stage 17. The radial peripheral extent adjusts in correspondence to the adjusting axial distance between the inner contours of the disc elements 38.1 and 38.2 on which the transmitting element 40 runs.

In FIG. 2, a drive shaft 42 of the automatic transmission stage 17 is shown in an axial distance to the output shaft 37 of the automatic transmission stage 17 (variator). The drive shaft 42 of the automatic transmission stage 17 includes a second pulley 39 configured in the same manner as the first pulley 38. The second pulley 39 includes a disc element 39.1 which is mounted so as to be stationary and fixed in the axial direction and is accommodated on the output shaft 37 of the automatic transmission stage 17 so as to rotate therewith. A second disc element 39.2 is displaceable with reference to the drive shaft 42 and lies opposite the first disc element 39.1 fixed in the axial direction. The pulleys 38 and 39 of the automatic transmission stage 17 can have different diameters depending upon the axial distance of the output shaft 37 and the drive shaft 42, respectively, of the automatic transmission stage 17 so that a wide range of transmission ratios $U_G$ of the automatic transmission stage 17 (variator) can be continuously adjusted under load.

The inner sides of the fixedly mounted disc element 39.1 and the second disc element 39.2 are also provided with diameters, which change in the radial direction, so that different radial running paths of the transmitting element 40 between the first pulley 38 and the second pulley 39 can be adjusted continuously and therefore different transmission ratios $U_G$ of the automatic transmission stage 17 (variator) can be continuously adjusted. These different radial running paths correspond to an axial movement of the second disc elements 39.1 and 39.2 relative to fixedly mounted disc elements 38.1 and 38.2, respectively.

From the presentation of the automatic transmission stage 17 (variator) in FIG. 2, it is evident that the second disc elements 38.2 and 39.2 are charged with contact forces $F_S$ and $F_P$, respectively. The contact forces correspond to the output signals 20 which are generated by the variator controller 16 of the automatic transmission stage 17 while considering the instantaneous drive situation of the motor vehicle.

The contact forces $F_S$ and $F_P$ axially charge the movable disc elements 38.2 and 39.2, respectively. With these contact forces $F_S$ and $F_P$, a slip-free operation is adjusted in the automatic transmission stage 17 (variator). At the same time, dependent upon the drive situation, a slip-free operation of the clutch 19 can be achieved by developing a corresponding contact force $F_K$ charging the clutch 19. More specifically, a relative speed-free rotation of the clutch parts 32 and 33 relative to each other can be achieved. The contact force $F_K$ and the contact forces $F_P$ and $F_S$ are influenced by the torque and contact-force reserve determination 12 and make possible a direct consideration of the instantaneous drive situation of the motor vehicle wherein the automatic transmission stage 17 (variator) and the parameters, which are considered via the contact-force control 18 for the clutch 19, are contained. The automatic transmission stage 17 (variator) is controlled via the variator controller 16. The internal combustion engine is coupled to the drive shaft 42 of the automatic transmission stage 17 (variator). A hydraulic pump (not shown) and a torque converter (not shown) having a bridge coupling as start-drive elements can be mounted between the internal combustion engine and the drive shaft 42. The clutch 19 is disposed on the output end of the automatic transmission stage 17 (variator). However, transmission configurations are also provided wherein the clutch 19 can be mounted on the drive end of the automatic transmission stage 17 (variator). According to this alternate embodiment, the clutch 19 is disposed on the path between the engine and the primary pulley 39.

The drive situations, which are determined from the listed input quantities, are preferably classified in the electronic control of the automatic transmission stage 17 (variator) of the motor vehicle. Depending upon the position of the selection lever of the automatic transmission stage 17, the standstill or a drive situation of the vehicle close to standstill can be detected for a selected selection lever position P or N. Furthermore, the standstill of the vehicle or an almost standstill condition with the selection lever stage D (forwards) or for a set selection lever stage R (rearwards) can be detected and correspondingly classified. Furthermore, for the selected selection lever stages D and R of the selection lever of the automatic transmission stage 17 (variator), slow travel with low load in the forward direction as well as in the rearward direction can be detected at constant speed and classified. For forward travel in the selection lever stage D, an acceleration at high load can be detected and classified and also an acceleration under high load can be detected in the selection lever position R which is infrequently seen as a drive situation but cannot be completely excluded.

Rapid travel on an expressway can be detected, for example, via the detection of the vehicle speed and an exceeding of the speed threshold of selection lever position D of the automatic transmission stage 17 (variator). A travel with a high engine or transmission rpm in the selection lever position D (forward travel) during an uphill climb can likewise be detected. For the selection lever adjusted in the position N (neutral), a travel without force connection to the wheels, which are driving the motor vehicle, can be determined which is the same as a downward rolling or a rolling of a motor vehicle to standstill. In contrast, the movement of the motor vehicle on a poor roadway at low speed and different wheel rpms ($n_1$ to $n_4$) can be detected as can the activation of an ASR intervention or an ABS intervention. Furthermore, driving in the selection lever stages D or R with an applied parking brake can be detected as a drive situation in the same manner as driving in an electronic emergency or a partially electronic emergency operation of the internal combustion engine which drives the motor vehicle. In city operation, an operation of the motor vehicle in the drive situation "start of engine in start/stop operation" can be detected.

It is understood that the foregoing description is that of the preferred embodiments of the invention and that various changes and modifications may be made thereto without departing from the spirit and scope of the invention as defined in the appended claims.

What is claimed is:

1. A method for controlling the operation of an automatic transmission stage and of a clutch coacting with said automatic transmission stage, the method comprising the steps of:

assigning a variator controller to said automatic transmission stage and a contact-force control to said clutch;

determining a torque force reserve for said clutch and for said automatic transmission stage in dependence upon recognized and classifiable driving situations;

supplying said torque force reserve for said clutch to an input quantity ($M_E$) of said contact-force control;

supplying said torque force reserve for said automatic transmission stage to said input quantity ($M_E$) of said variator controller;

forming respective output signals of the contact-force control and the variator controller;

wherein the output signals of the contact-force control represent contact forces (Fk) which act on parts of said clutch; and, wherein output signals of the variator controller represent contact forces ($F_S$, $F_P$) which act on transmitting elements of said automatic transmission stage.

2. The method of claim 1, wherein said contact-force control for said clutch is a slip controller.

3. The method of claim 1, wherein said input quantity ($M_E$) is a torque signal representing the torque to be transmitted by said automatic transmission stage and, if required, is increased or decreased by additional stages or consumers present between said internal combustion engine and a drive shaft of said automatic transmission stage.

4. The method of claim 1, comprising the further step of supplying said torque force reserve of said automatic transmission stage to said input quantity of said variator controller at a first summation point.

5. The method of claim 4, comprising the further step of supplying said torque force reserve of said clutch to said input quantity of said contact-force control at a second summation point.

6. The method of claim 5, wherein the supply of said torque force reserves to said summation points takes place simultaneously.

7. The method of claim 1, wherein positions (P, D, R, N; 4, 3, 2, 1) of a selection lever of the automatic transmission are included in the determination and classification of the driving situation.

8. The method of claim 1, wherein positions (4AT, N, 4LO, 2AT) of a selection lever of said automatic transmission in an "off-road travel" mode are included in the recognition and classification of the driving situation.

9. The method of claim 1, wherein chassis damping stages (I, II, III, IV) of a hydraulically or pneumatically charged suspension system of a motor vehicle are considered in the detection and classification of the driving situation.

10. The method of claim 1, wherein quantities ($n_1$, $n_2$, $n_3$, $n_4$; $\omega$, $n_{MOT}$, $v_F$, $M_{MOT}$), which influence a driving dynamic, are considered in the detection and classification of the driving situation.

11. The method of claim 1, wherein clutch quantities and transmission quantities ($n_{G1}$, $n_{G2}$; $U_G$, $a_1$, $a_2$) are considered in the detection and classification of the driving situation.

12. The method of claim 1, wherein accelerator pedal signals ($h_1$, $h_2$) are considered in the detection and classification of the driving situation of the motor vehicle.

13. The method of claim 1, characterized in that quantities (P, D, R, N; 4, 3, 2, 1; 4AT, N, 4LO, 2AT; I, II, III, IV; $n_1$, $n_2$, $n_3$, $n_4$; $\omega$, $n_{MOT}$, $v_F$; $n_{G1}$, $n_{G2}$; $M_{MOT}$; $u_G$, $a_1$, $a_2$; $h_1$, $h_2$), which characterize the driving situation, are supplied to a torque/contact-force reserve means via a central bus system.

14. The method of claim 13, characterized in that quantities (P, D, R, N; 4, 3, 2, 1; 4AT, N, 4LO, 2AT; I, II, III, IV; $n_1$, $n_2$, $n_3$, $n_4$; $\omega$, $n_{MOT}$, $v_F$; $n_{G1}$, $n_{G2}$; $M_{MOT}$; $u_G$, $a_1$, $a_2$; $h_1$, $h_2$), which characterize the driving situation, are supplied to situation, are supplied to the contact-force control as input quantities.

15. The method of claim 1, wherein operating parameters ($n_{MOT}$, $M_{MOT}$, $s_{MOT}$) of an internal combustion engine are considered in the detection and classification of the driving situation.

16. The method of claim 2, comprising the further step of considering at least one of the following signals:

(a) an engine torque ($M_{MOT}$) which is determined by the engine control;

(b) an engine rpm ($n_{MOT}$) and quantities derived therefrom;

(c) transmission rpms ($n_{G1}$, $n_{G2}$); and, (d) clutch signals ($a_1$, $a_2$);

for determining the input quantity ($M_E$), wherein said input quantity ($M_E$) represents an input torque.

17. The method of claim 1, comprising the further step of supplying said torque force reserve of said clutch to said input quantity of said contact-force control at a second summation point.

* * * * *